Nov. 18, 1969   K. NURMSE   3,478,978
BRAKING DEVICE FOR FISHING REELS, ESPECIALLY FOR FLY FISHING
Filed June 12, 1967   2 Sheets-Sheet 1
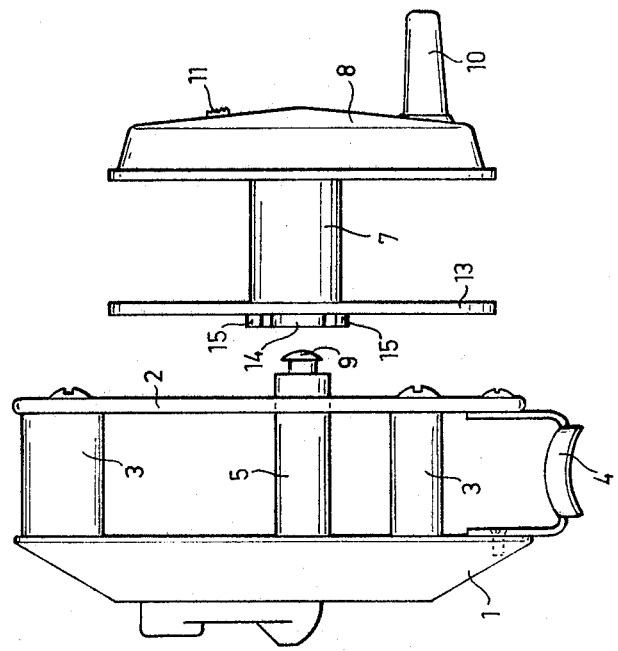
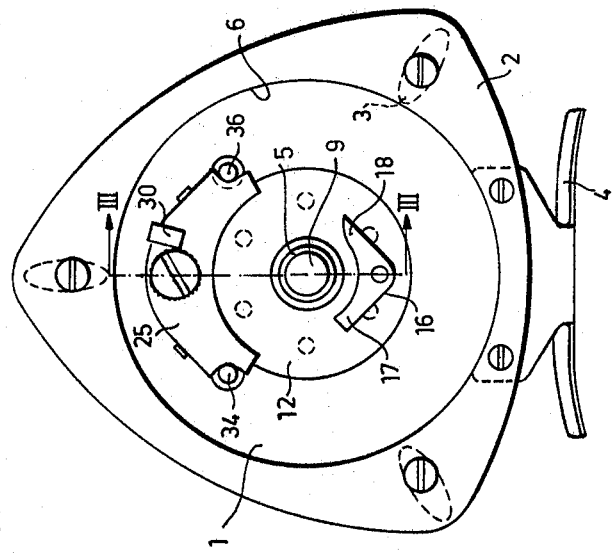
KARL NURMSE
INVENTOR.

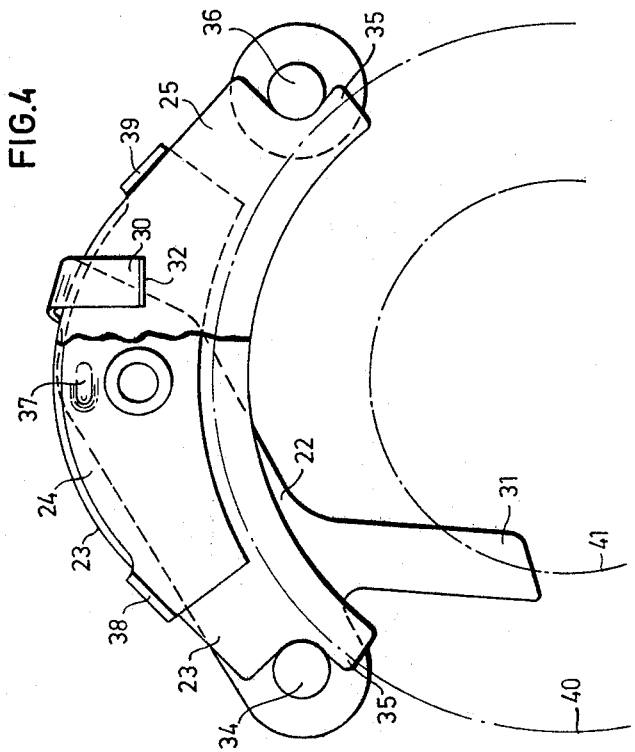
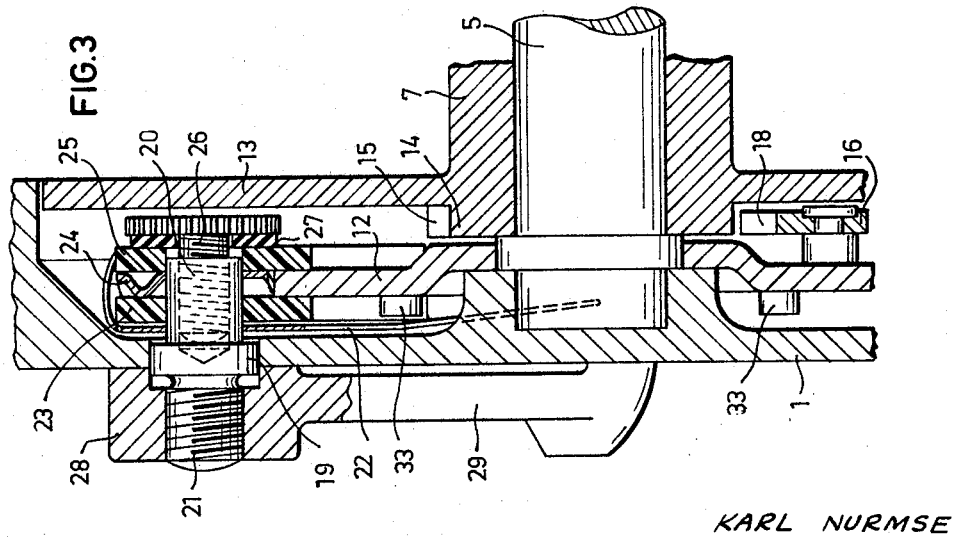

United States Patent Office 3,478,978
Patented Nov. 18, 1969

3,478,978
**BRAKING DEVICE FOR FISHING REELS,
ESPECIALLY FOR FLY FISHING**
Karl Nurmse, Svangsta, Sweden, assignor to ABU Aktiebolag, Svangsta, Sweden, a Swedish corporation
Filed June 12, 1967, Ser. No. 645,420
Claims priority, application Sweden, June 15, 1966,
8,176/66
Int. Cl. A01k 89/02
U.S. Cl. 242—84.51     3 Claims

ABSTRACT OF THE DISCLOSURE

A braking device for fishing reels with rotatable line spool, especially fly reels, having a brake disc coaxial with the line spool and with brake blocks on both sides of the brake disc located at the outer periphery of the brake disc. A rapid-adjustment lever outside the reel permits regulating the braking force within settable limits by adjusting the force with which the brake blocks are pressed against the brake disc. A ratchet device has the double function of preventing braking during reeling in and of giving an acoustic signal during reeling out.

---

This invention relates to a braking device for a fishing reel, particularly for fly fishing, comprising a line spool which is removably slipped onto a shaft fixed to a first transverse wall through an opening in a second transverse wall and which is arranged to cooperate with a braking device located in said first wall for producing a frictional resistance against rotation of the spool in the line unwinding direction.

In known fishing reels of the type described above the braking device usually consists of brake discs coaxial with the spool shaft and alternately stationary in the transverse wall and rotatable together with the spool in the unwinding direction. The discs are pressed into engagement with each other with adjustable force with the aid of resilient means. The required devices for keeping at least one disc in axial position in the wall, the brake discs, the resilient means pressing the brake discs together and means for adjusting this force are arranged axially one after the other and require considerable axial space. The transverse wall containing the braking device therefore becomes relatively thick. The braking force is applied with comparatively small moment arm, necessitating making the elastic means and the adjustable means large and strong. The engagement pressure between the discs is great unless a larger number of discs are arranged in series axially. The adjustment of the braking force is sensitive and small irregularities in the braking action are immediately noticeable.

An object of the invention is to eliminate the drawbacks mentioned above, and this is accomplished with a braking device according to the invention which is characterised in that a brake disc, which can be brought along in the unwinding direction by the spool, is loosely journalled on said shaft and at its periphery projects between two brake blocks, which are forced against opposite sides of said brake disc by an adjustable screwthread device located outside the periphery of the brake disc and extending through the brake blocks, the force with which said brake blocks are pressed against said brake disc being adjustable by means of said screwthread device.

Since the brake blocks engage the periphery of the disc at a relatively large radial distance from the rotational axis of the brake disc, a comparatively small friction surface and low engagement pressure is required. The required axial space and wear is small and the braking force can be evenly applied and is easily adjustable.

One embodiment of the invention is shown schematically on the attached drawings. FIG. 1 is a front view of a fly reel provided with a braking device according to the invention, shown with the line spool removed from its shaft. FIG. 2 is a side view of the reel with removed line spool. FIG. 3 is a cross section along line 3—3 of FIG. 1 shown on an enlarged scale. FIG. 4 is a fragmentary view of the braking device shown as in FIG. 1 but on an enlarged scale and with removed outer brake block.

According to FIGS. 1 and 2, the reel comprises two transverse walls 1 and 2, which are interconnected by posts 3 and which carry a foot 4 for fixing the reel to a rod. The transverse wall 1 constitutes a casing for the braking device and carries a fixed shaft 5. The second transverse wall 2 has an opening 6 corresponding to the spool flanges, through which openings the spool 7 is inserted into the reel when it is slipped onto shaft 5. The outer flange 8 of spool 7 is provided with inner resilient retaining means, not shown, which engage the free end of shaft 5 behind a small head 9 thereon when the spool is slipped into position in the reel. The outer flange 8 of the spool is provided with a crank 10 and a finger grip 11 for releasing the retaining means when the spool is to be drawn off said shaft 5. The structure so far described is known per se and forms no part of the present invention.

Inside the transverse wall 1, a brake disc 12 is journalled for free rotation on shaft 5 according to the invention, see also FIG. 3. The spool 7 has a hub 14 with radial projections 15 protruding axially from the outer face of the spool inner flange 13. An angle-shaped pawl 16 is journalled for free rotation on the side of the brake disc facing the spool. Said pawl has a transverse end face on one leg 17 and a wedge-shaped bevelled end on the other leg 18. The rocker pawl 16 is located in such a manner that the projections 15 of the spool will lift said leg 18 when the spool is rotated for winding in the line (clockwise according to FIG. 1), and the brake disc 12 is therefore not brought along by the spool during reeling in. When the spool is rotated in unwinding direction (counterclockwise according to FIG. 1), said leg 17 engages one of the projections 15 whereby the brake disc 12 is brought along with the rotation of the spool in its unwinding direction when the line is reeled out.

Outside the periphery of the brake disc 12, the wall 1 is provided with a hole of the same cross sectional shape as a flange 19 fitting therein, which flange with the aid of straight bevelled portions is journalled for axial movement in the hole but is non-rotatable therein. This flange 19 is located on a pin with a smooth cylindrical part 20 extending towards the inner face of said wall 1 and having a screw-threaded portion 21 extending on the outer side of wall 1. The smooth portion 20 extends through a hole in a laminated type spring 22, a disc-shaped brake block 23 and a spring washer 24, seen in the direction from flange or collar 19, and the end of this portion 20 extends into a hole in a second brake block 25. A screw 26 with knurled head perimeter is screwed into the end of this smooth portion 20 of the pin, and the head of the screw holds said parts together on this pin with the aid of an elastic washer 27. The edges of the brake blocks 23 and 25 turned towards the spool shaft extend in over the edge of said brake disc 12 on each side thereof. The screw-threaded portion 21 is screwed into the hub 28 of a lever 29 on the outer face of wall 1.

If the spool 7 is pulled out and screw 26, washer 27, brake block 25 and brake disc 12 are removed and the device is observed from the right in FIG. 3, the spring washer 24, the second brake block 23 and the laminated type spring 22 are visible in the manner shown in FIG. 4. The leaf spring 22 consists of a flat portion with two lugs 30 and 31. One lug 30 is bent over the outer edge of both brake blocks 23 and 25 and has an upwardly bent end edge 32 cooperating with the knurling on the head of the screw 26 to prevent same from accidental rotation. The second lug 31 projects below brake disc 12 and its end is bent out from the transverse wall 1 in order to cooperate with pins or projections 33 on the underside of the brake disc 12 so as to form an acoustic warning device and a ratchet for preventing the brake disc from rotating in reeling-in direction. When the spool is rotated in reeling-out or unwinding direction the brake disc 12 is brought along and the pins 33 alternately depress and release the lug 31, thereby creating a sound signalling that the line is being drawn out. The spring 22 is maintained in position by a pin 34 secured to the transverse wall 1, this pin extending through a corresponding hole in the flat portion of the laminated type spring. The brake blocks are kept in position by the smooth pin portion 20 and also by end abutments 35 which engage pin 34 at one end and a corresponding pin 36 at the other end of the brake blocks. The spring washer 24 which has the shape shown in FIG. 4, is bent in such a manner that its ends rest on the brake block 23 and its centre portion on the brake block 25, whereby the outer edges of the brake blocks are kept resiliently apart. In order to prevent the brake blocks from assuming an inclined position when the screw 26 is tightened down hard this spring washer is furthermore close to its outer edge provided with a pressed-in projection 37 serving as a spacer to always maintain a minimum distance between the outer edges of the brake blocks. The spring washer 24 is kept in position relative to the brake blocks with the aid of two upstanding lugs 38, 39, which rest against the outer edge of brake block 25. In FIG. 4 the position of the periphery of brake disc 12 is shown with the chain-dotted circle 40 and the path of movement of pins 33 is shown with the chain-dotted circle 41.

The lever 29 can be turned a given angle between end abutments (not shown). When the lever 29 is turned the entire pin 21-20 with screw 26 is pulled more or less outwards while the brake blocks are pressed together with greater or lesser force. The limits of braking force in the end positions of lever 29 are adjustable by screwing the screw 26 in or out. In this manner, a very fast and easy adjustment of braking force between two limit values is achievable by actuation of lever 29, which may cooperate with a scale or chart on the outer face of transverse wall 1, and individual requirements concerning the location of the adjustment range may be provided by setting screw 26.

The invention is not limited to the embodiment described above and shown on the drawings. If a simplified reel is desirable, the pin 20 can be fixedly mounted in the transverse wall 1 and the rapid adjustment device be excluded. Alternatively, it is possible to replace the screw with a fixed end collar on pin 20 and replace lever 29 with a manually operable knob, so that all adjustments may be made with this knob. The reel may be easily adapted to lefthanded persons if the pawl 16 is arranged reversible and the reel is supplied with an additional laminated type spring 22, which may be mounted on the pin 20 and the right abutment pin 36 with a lug 31 extending towards an opposite part of the path of movement of the pins 33. The laminated type spring may, if desirable, be so shaped and arranged, that it can be turned about pin 20 to either one of two positions with one or the other of two lugs 31 extending into the path of movement of pins 44.

What I claim is:

1. The combination in a fly fishing reel with a stationary shaft supported at a first end of a spool revolubly mounted on said shaft, complementary means on said shaft and said spool to disengageably lock said spool on said shaft against axial movement, a hub on said reel adjacent said first end of said shaft, spaced radial projections on said hub, a disc rotatably journaled on said shaft adjacent said hub, a one-way rocker pawl operatively pivoted on said disc in the path of said projections to cooperate therewith to form a one-directional driving engagement in a direction of a first hand between said spool and said disc, a plurality of abutments on the side of said disc distant from said spool, a stationary laminate spring having a free end engaging said abutments to provide a one-way driving connection therewith in the direction of opposite hand to said first hand, said spring yieldably clicking upon rotation of said disc in the direction of said first hand, a pair of brake shoes mounted in a stationary position to grip therebetween the side surfaces of said disc adjacent the periphery, said brake shoes being yieldably separated radially distal of said disc, and actuating means engaging said brake shoes to draw said shoes together to a point outside the radius of said disc is braked and said spool is braked in said direction of the first hand and said spring clicks when said spool is so rotated.

2. The device of claim 1 further characterized in that said actuating means are screw means and said laminate spring has a projection thereon engaging said screw means to frictionally prevent accidental rotation thereof.

3. The device of claim 1 further characterized in that said actuating means are screw means comprising, an axially slidable member, an adjustable abutment on said axially slidable member adjustable to an actuating position on said brake shoes, and a rotatable member threadedly engaging said axially slidable member to vary its axial displacement whereby actuation by said adjustable abutment may be selectively increased and decreased for any adjustment of said adjustable abutment.

References Cited

UNITED STATES PATENTS

| | | | |
|---|---|---|---|
| 1,005,154 | 10/1911 | Catucci | 242—84.5 |
| 2,059,765 | 11/1936 | Adams | 242—84.51 |
| 2,180,321 | 11/1939 | Kovalovsky et al. | 242—84.44 |
| 2,993,660 | 7/1961 | Parks | 242—84.51 |
| 3,120,357 | 2/1964 | Wood. | |

BILLY S. TAYLOR, Primary Examiner

PO-1050
(5/69)

UNITED STATES PATENT OFFICE
CERTIFICATE OF CORRECTION

Patent No. 3,478,978  Dated November 18, 1969

Inventor(s)  Karl Nurmse

It is certified that error appears in the above-identified patent and that said Letters Patent are hereby corrected as shown below:

Column 4, line 6, after "movement" insert --41-- and cancel "44" and insert --33--; line 30, claim 1, cancel "to" and insert --at--; line 31, claim 1, before "is braked" insert --whereby said disc--.

SIGNED AND SEALED
DEC 15 1970

(SEAL)
Attest:

Edward M. Fletcher, Jr.
Attesting Officer

WILLIAM E. SCHUYLER, JR.
Commissioner of Patents